United States Patent [19]

Thurston

[11] Patent Number: 4,621,792
[45] Date of Patent: Nov. 11, 1986

[54] CUTTING TOOL ATTACHMENT

[76] Inventor: Antony N. Thurston, 11 Para Street, Balwyn, Victoria 3103, Australia

[21] Appl. No.: 757,837
[22] PCT Filed: Oct. 26, 1983
[86] PCT No.: PCT/AU83/00155
 § 371 Date: Jun. 26, 1985
 § 102(e) Date: Jun. 26, 1985
[87] PCT Pub. No.: WO85/01903
 PCT Pub. Date: May 9, 1985
[51] Int. Cl.$^4$ .............................................. B23K 7/10
[52] U.S. Cl. ...................................................... 266/70
[58] Field of Search ...................................... 266/70, 66

[56] References Cited

U.S. PATENT DOCUMENTS 3,139,471 6/1964 Root ....................................... 266/66
3,174,736 3/1965 Cameron ................................ 266/66
3,514,087 5/1970 Richards ................................ 266/66
4,173,333 11/1979 Wise ...................................... 266/66
4,283,043 8/1981 Kalian ................................... 266/66

Primary Examiner—Wayland Stallard
Attorney, Agent, or Firm—Sughrue, Mion, Zinn, Macpeak, and Seas

[57] ABSTRACT

An attachment for a cutting torch includes a support member for supporting a cutting head of a cutting torch and a guide member in the form of a travelling wheel assembly for guiding the cutting head at a suitable height for operation. An offset pivot rod is provided for use as a fulcrum or central support and a common mounting frame is provided for releasably mounting. The guide member and the pivot rod. Upon rotating the common mounting member about the pivot rod the cutting head will traverse a circle at the proper height relative to the work piece for cutting a circular plate of metal from a metal sheet.

9 Claims, 9 Drawing Figures

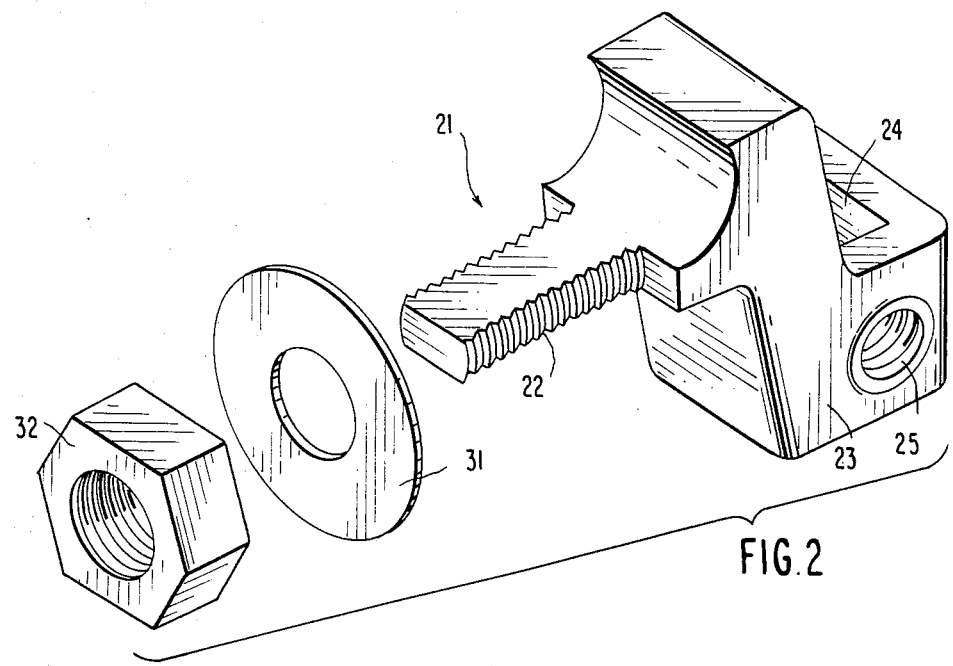
FIG. 2
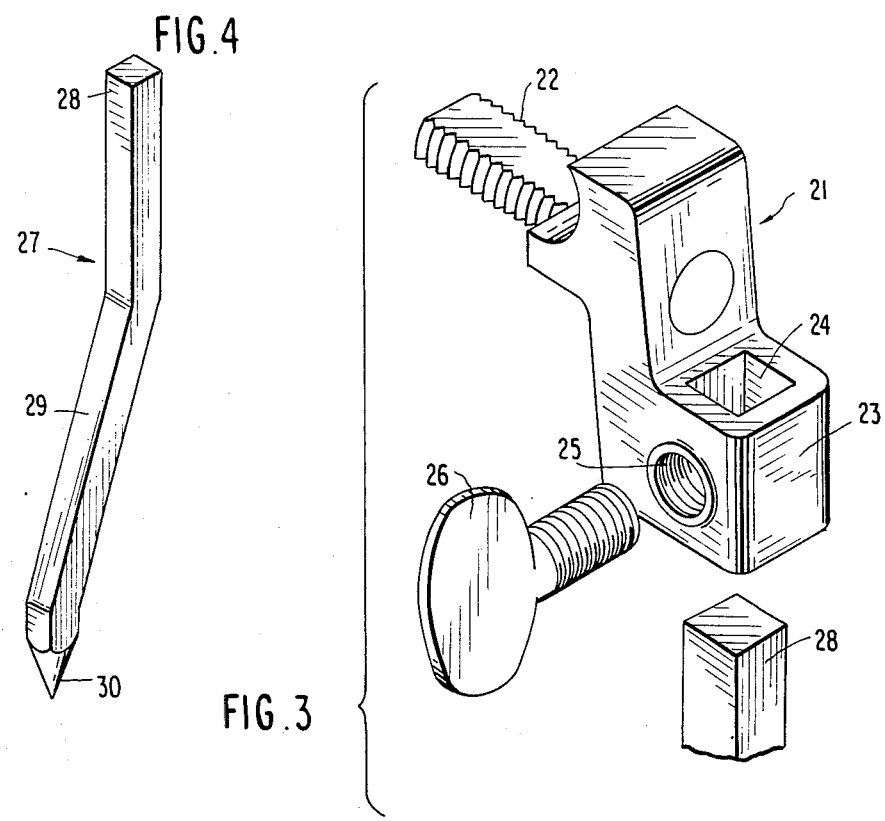
FIG. 4
FIG. 3

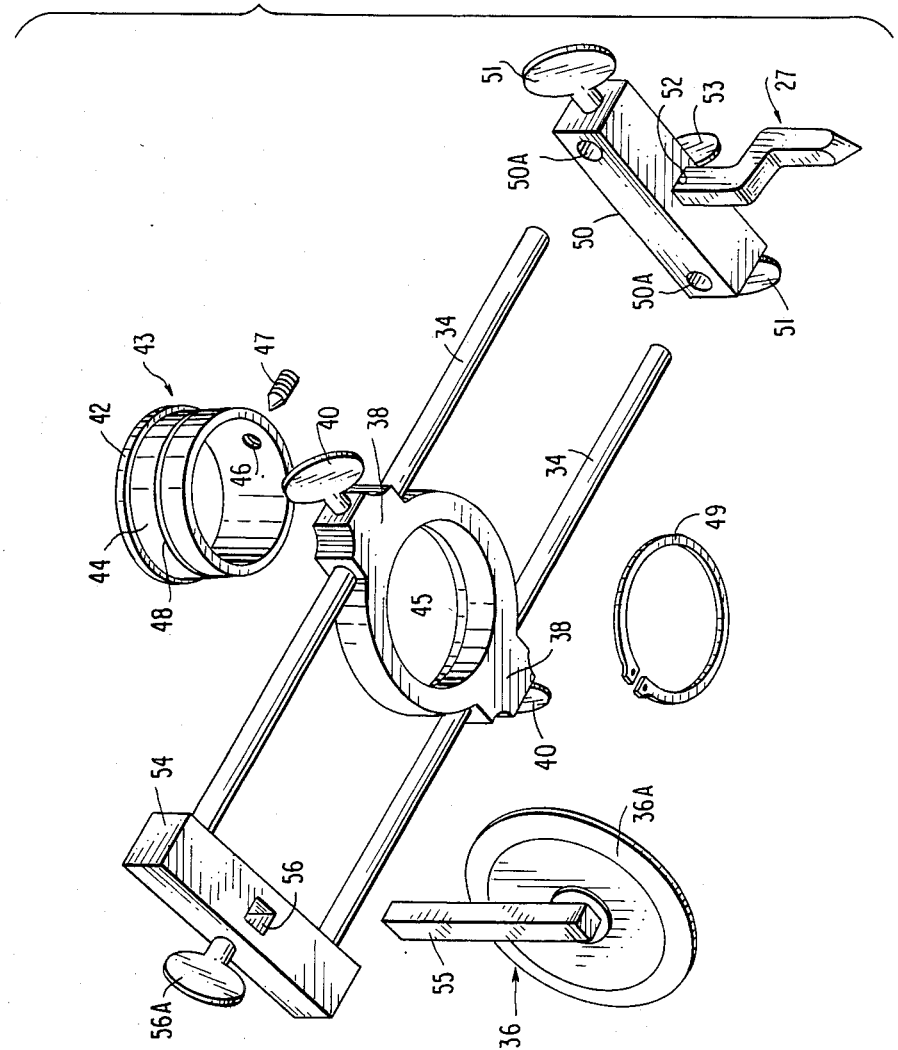

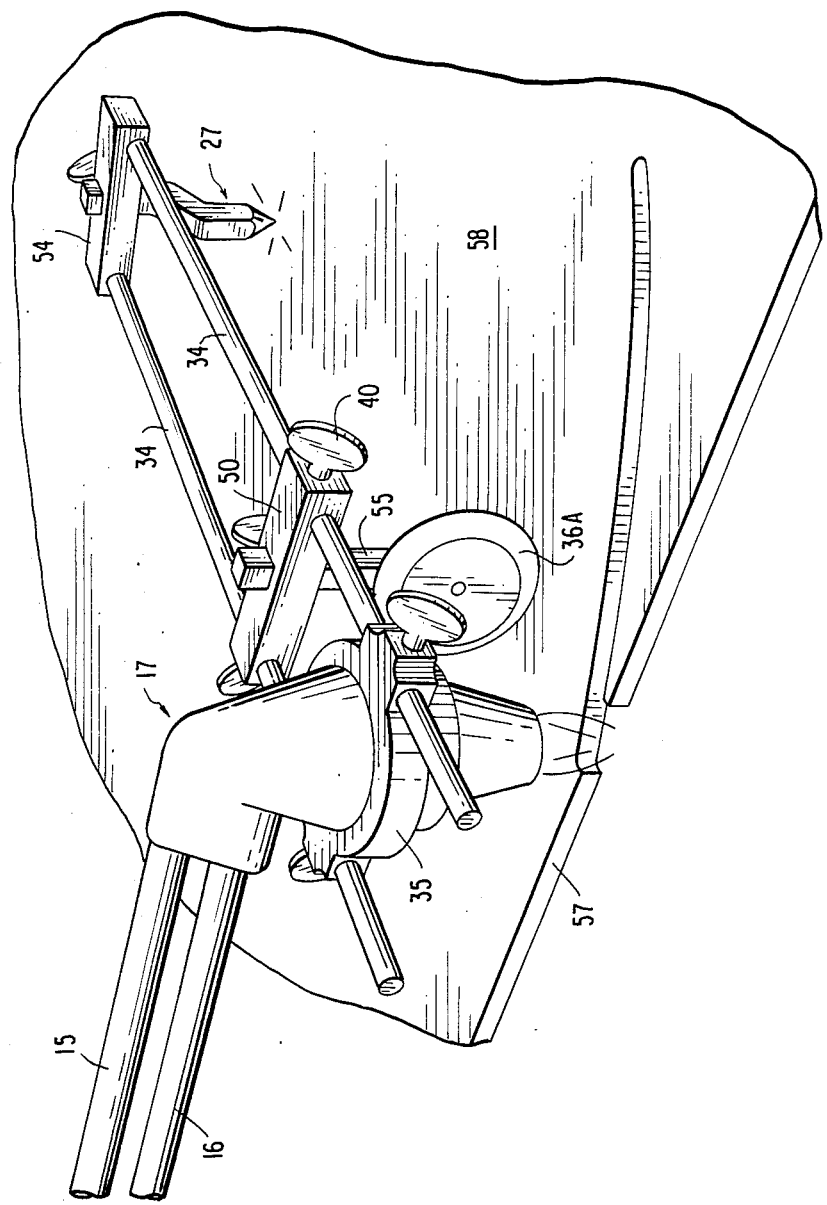

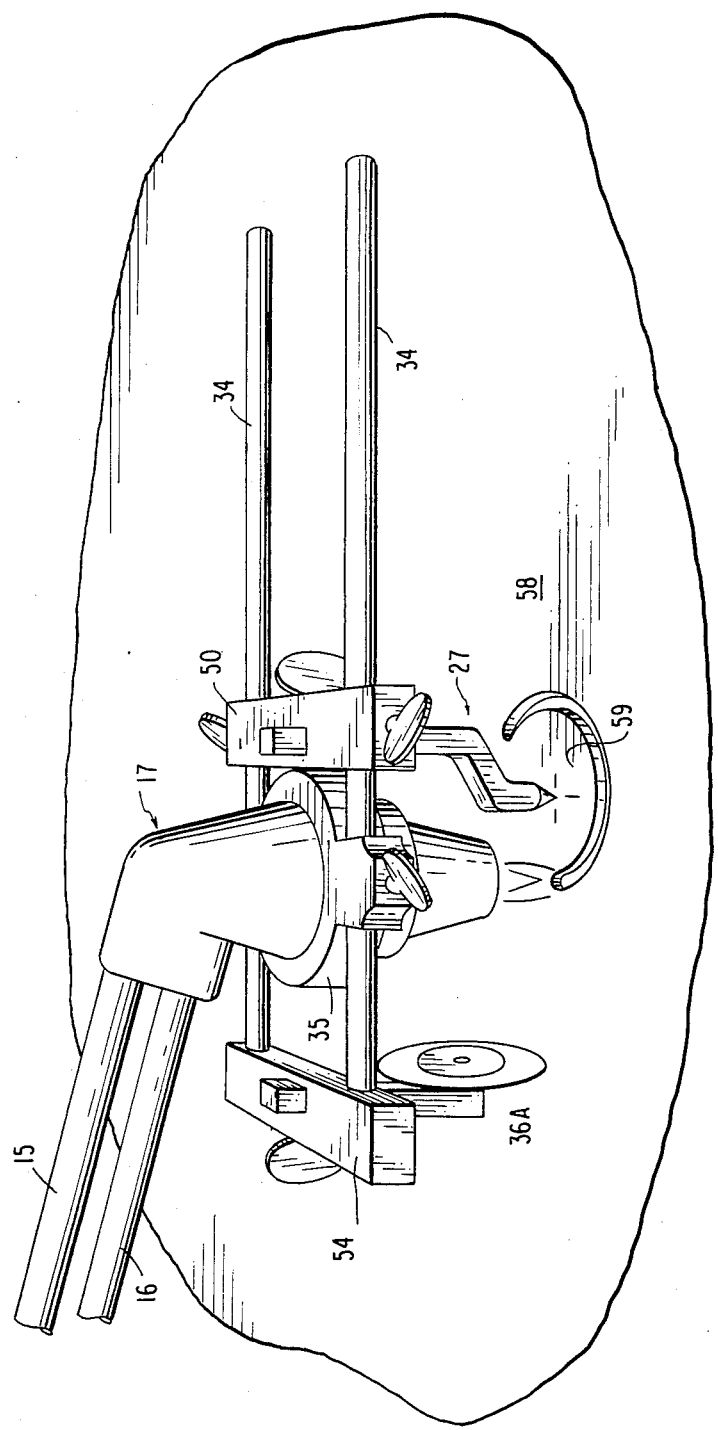

CUTTING TOOL ATTACHMENT

This invention relates to an attachment for a cutting tool which when fitted to gas-operated apparatus such as oxy-acetylene torches is primarily useful in cutting discs or circular plates of metal from a metal sheet.

Hitherto conventional welding tools or attachments for the abovementioned purpose included an attachment which comprised a support cradle which was attachable to the cutting head of the cutting torch by screw members wnhich attachment included a roller wheel on one side of the support cradle and a laterally extending rod on the other side of the support cradle to which was releasably attached a compass point. The operator would then grasp the cutting torch rearwardly of the support cradle and then cut a circle in a metal sheet supporting the assembly of cutting torch and attachment by manipulating the assembly so that the cutter transcribed a circle with the assistance of the roller wheel and using the compass point as a guide or fulcrum.

In another conventional arrangement which was similar to that described above the support cradle was in the form of a retaining collar which contained a bearing for rotatably supporting the cutting head.

In relation to the prior art it has now been found that in each case the guide wheel was fixed or rigidly mounted to the support cradle and thus when it was desired to place the cutting head at the extreme peripheral edge of the metal sheet this was normally not possible to do because the guide wheel formed an obstruction. Because of this problem wastage occurred in relation to effective utilization of the metal sheet especially when attempting to obtain the maximum number of metal discs or circles from the same metal plate.

Also it was found that it was usually not possible to cut discs or circles of relatively small diameter and thus normally the discs had a minimum diameter of 80 mm.

It was also found that in some cases the prior art cutting tool attachments as described above were relatively unstable in operation and required a very sure hand to manipulate when cutting the metal plate which was usually formed from steel and in these circumstances the quality of workmanship could suffer as well as efficiency of operation.

An object of the invention is therefore to provide a cutting tool attachment which when fitted to a cutting tool or cutting torch enables discs or circular plates of metal to be cut from a metal sheet in a manner which alleviates the abovementioned difficulties associated with the prior art.

The invention therefore in one aspect provides an attachment for a cutting torch including:

a support member for supporting a cutting head of the cutting torch;

guide means for guiding the cutting head at a suitable height for operation;

pivot means for use as a fulcrum or central support; and common mounting means for releasably mounting each of said support member, said guide means and said pivot means, the construction and arrangement being such that in use said cutting head may cut a circular plate of metal from a metal sheet when supported by said support member and guided by said guide means using said pivot means as a central support or fulcrum whereby each of said support member, said guide means and said pivot means is interchangeable.

The common mounting means in one form may comprise an elongate rod or rail to which suitably all of the pivot means, support member and guide wheel are releasably mounted. More preferably however the common mounting means includes a mounting frame including a pair of opposed guide rods or rails to which all of the pivot means, support member and guide wheel are releasably mounted.

Thus in one form the pivot means which suitably in the form of a pivot rod having a compass point wherein the pivot rod has an offset shank which is preferably bent inwardly toward the cutting head in use and is attachable to a first mounting block having a central vertically oriented passageway for retention of the top end of the pivot pin and also substantially parallel and horizontal or longitudinal passageways for retention of said pair of opposed guide rods. Any suitable form of releasable locking means can be used to lock each guide rod in position such as thumb screws and the like. The same sort of locking means may be used for the top end of the pivot rod. Thus in this arrangement the mounting block is slidably attached to the mounting frame.

In similar manner a second mounting block may be used to attach the guide means which preferably comprises a guide wheel attached to a vertical shaft to the pair of opposed guide rods. Thus the second mounting block suitably also has a central vertically oriented passageway for retention of the vertical shaft attached to the guide wheel. There also may be provided in relation to the second mounting block a pair of substantially parallel horizontal passageways for retention of each guide rod. A similar locking means for said vertical shaft may be used as described above for the pivot rod. Thus the second mounting block may be slidably attached to the mounting frame if desired.

More preferably however one of the abovementioned mounting blocks is rigidly or permanently attached to the pair of guide rods suitably at the end thereof. This arrangement provides a more stable mounting means in use. The fixed mounting block in this arrangement only may include a central single vertical passageway for retention of the top end of the pivot rod or the vertical shaft of the guide wheel as may be required. Only a single locking screw will therefore be required.

In one form the support member may include a retaining collar having opposed end projections each containing a horizontal passageway for retention of an associated guide rod. Again a suitable form of releasable locking means that may be used is a thumb screw.

Suitably the retaining collar has mounted therein a bush member to which the cutting head may be releasably attached by releasable locking means such as a socket screw which may be actuated by a key member such as an Allen key or the like. The bush member may be releasably attached to the retaining collar by a circlip engageable with a mating abutment or shoulder of the bush assembly so as to retain the bush member within the retaining collar but permit rotation relative thereto.

In the above described arrangement the assembly of bush member and cutting head may be rotated relative to the retaining collar in use which will provide steady control of the cutting head in use.

In a second aspect the invention provides a pivot pin assembly for attachment to a cutting torch having an offset shank or pivot rod which is inwardly bent or oriented towards the cutting head in use so as to effectively decrease the diameter of the circular disc or plate which may be cut from a metal sheet.

Preferably in this aspect of the invention the pivot pin assembly is attached to the cutting torch by suitable releasable attachment means.

Suitably the attachment means includes an attachment block and a laterally extending finger or shaft which is preferably screw threaded. There also may be provided a washer and nut wherein the nut is screw threadedly engageble with the finger or shaft to attach the attachment to the cutting torch.

Suitably the pivot rod is releasably attachable to the attachment block but this is not absolutely necessary and it may be integral therewith.

Thus in this aspect of the invention there may be provided an engagement passage or socket in the attachment block for receiving the pivot rod. There also may be provided a screw member such as a thumb screw extending through an aperture in the attachment block located laterally of the engagement passage so that it abuts the pivot rod when engaged in the engagement passage.

The cutting torch to which the attachment of the invention may be used generally includes a control handle attached to separate gas lines such as oxygen and acetylene and having a plurality of actuating buttons or knobs. Extending from the control handle are generally a pair of rigid and substantially parallel conduits for each gas. Attached to the rigid conduits is generally a welding or cutting head which applies the cutting flame to the material being cut.

Suitably the attachment finger or shaft of the above described attachment means is insertable in the narrow gap between the abovementioned rigid conduits and is attachable thereto by the washer and nut described above.

Reference may now be made to a preferred embodiment of the invention as shown in the attached drawings wherein:

FIG. 2 is an exploded perspective view of the releasable attachment means utilized in the attachment of FIG. 1;

FIG. 3 is an exploded perspective view of the releasable attachment means shown in FIG. 2 from an alternative direction;

FIG. 4 is a perspective view of the pivot rod used in the attachment of FIG. 1;

FIG. 7 is an exploded bottom perspective view of the attachment of FIG. 5;

FIG. 8 is a perspective view showing the attachment of FIG. 5 used in cutting discs proximal to the peripheral edge of the metal sheet; and FIG. 9 is a perspective view of the attachment of FIG. 5 used in cutting discs of relatively small diameter from a metal sheet.

Figure 1:
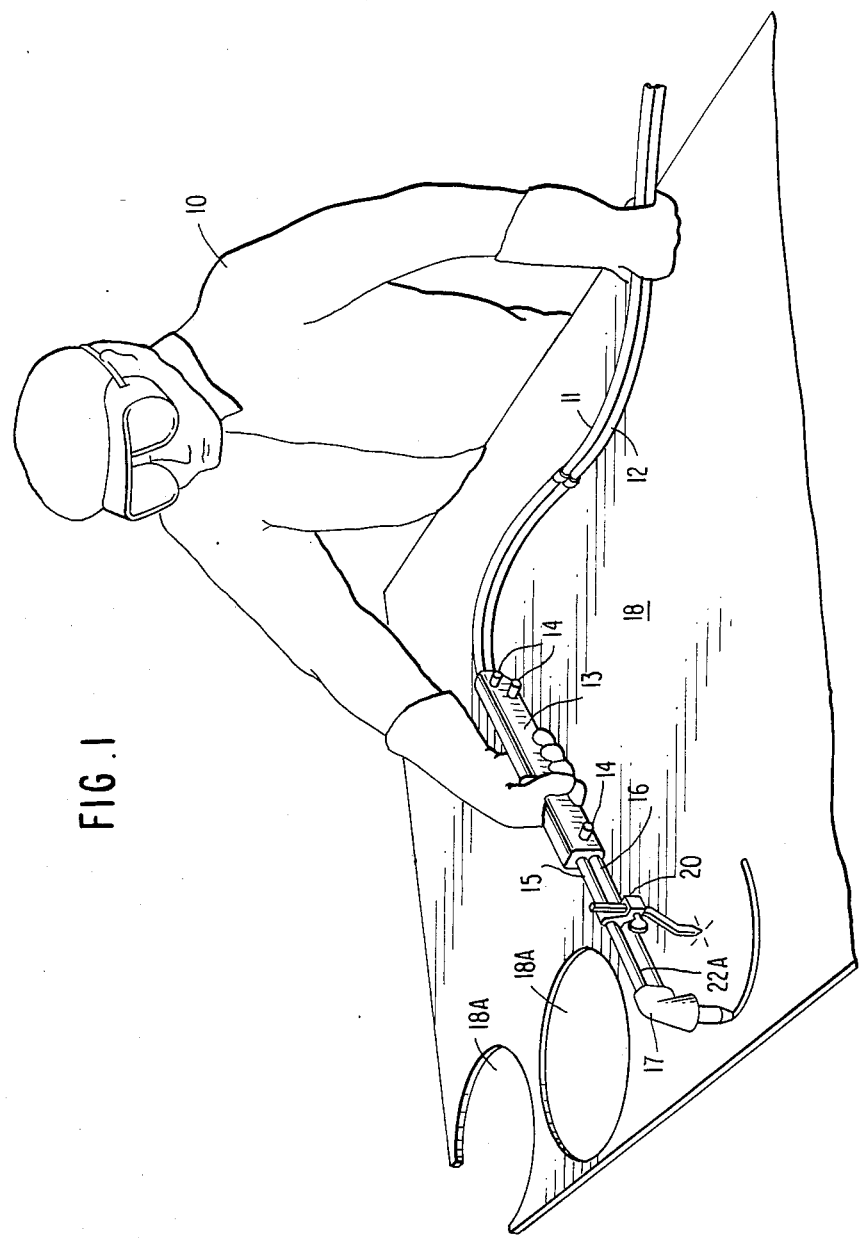
FIG. 1 is a perspective view of the attachment of second aspect of the invention in use.

In the drawings there is shown operator 10 holding a welding cutter having separate flexible gas lines 11 and 12 and control handle 13 having actuating buttons 14. There is also shown spaced rigid conduits 15 and 16 and cutting head 17. Attached to conduits 15 and 16 is attachment 20. Cutting head 17 is shown cutting an arcuate narrow slot or cutting line 19 in metal sheet 18. Also shown are circular apertures 18A representing spaces where circular plates of metal have been previously cut by cutting head 17.

Attachment 20 includes attachment means 21 including attachment block 23, screw threaded finger 22, engagement passage 24 and screw threaded aperture 25. There is also shown nut 32 and washer 31. It will be noted from FIG. 1 that finger 22 extends through the gap 22A between conduits 15 and 16 and is fastened thereto by nut 32.

There is also shown pivot rod 27 having an upper part 28 which engages in passage 24 of block 23 and is retained therein by screw member 26 which extends through screw threaded aperture 25. Pivot rod 27 includes an offset lower part 29 and compass point or pivot point 30.

In use the attachment 20 is quickly attached to the welding cutter as described above and is readily set up for operation by the operator 10. The welding attachment of FIGS. 1–4 may cut holes within a diameter range of 30–300 mm neatly, quickly and accurately. No support is required other than the pivot rod and the attachment may be used to cut closely to adjacent vertical surfaces. The attachment of the invention may also be used to cut plate between pipes by appropriate location of the pivot rod. Not only is the attachment 20 adjustable along conduits 15 and 16 as described above, but it is also height adjustable in relation to location of rod 27 in aperture 24 of block 23.

In FIGS. 5–9 the attachment 33 includes a mounting frame 32A including a pair of parallel guide rods 34 and retaining collar 35 for cutting head 17 as well as guide wheel assembly 36 having guide wheel 36A and pivot rod 27.

The retaining collar 35 has end projections 38 each having parallel passageways 39 for guide rods 34 which are locked in position by thumb screws 40. Retaining collar 35 also has a top inner peripheral groove 41 which engages with mating flange 42 of bush 43. Bush 43 includes intermediate part 44 which engages with internal surface 45 of collar 35 and aperture 46 for receiving screw 47 which may be unlocked by an Allen key (not shown). Also shown is abutment 48 which engages with circlip 49 so that bush 43 is rotatable relative to collar 35.

Also shown is movable or slidable mounting block 50 for either pivot rod 27 or guide wheel assembly 36 having parallel passageways 50A for guide rods 34 which may be releasably locked in position by thumb screws 51. Also shown is vertical passageway 52 for pivot rod 27 or shaft 55 of guide wheel 36A and locking screw 53.

Also shown is fixed mounting block 54 having a vertical passageway 56 for pivot rod 27 or shaft 55 of guide wheel 36A and associated locking screw 56A. Fixed mounting block 54 is located suitably at the ends of guide rods 34 and provides stability for mounting frame 32A in operation. Suitably the respective ends of guide rods 34 may be welded or permanently located in blind holes or sockets in block 54 by a press fit or interference fit.

Figure 5:
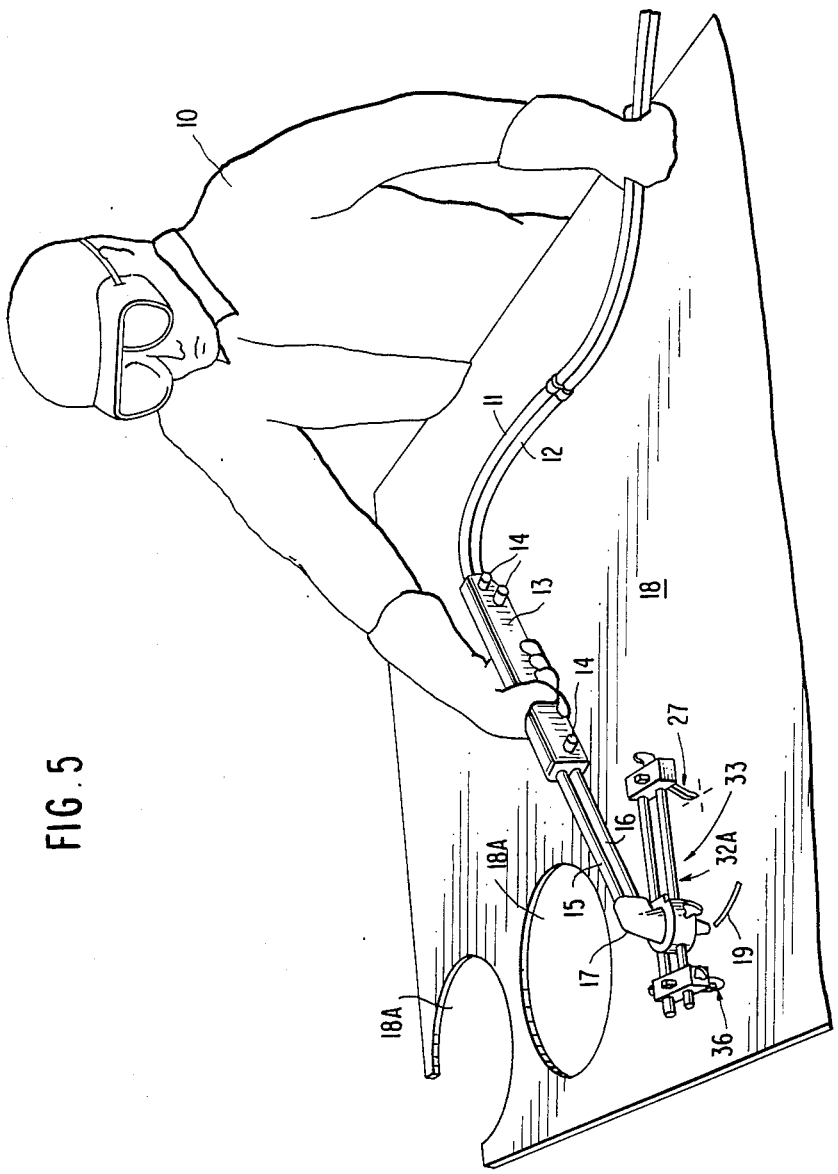
FIG. 5 is a perspective view of the attachment for a cutting torch constructed in accordance with the first aspect of the invention.
Figure 6:
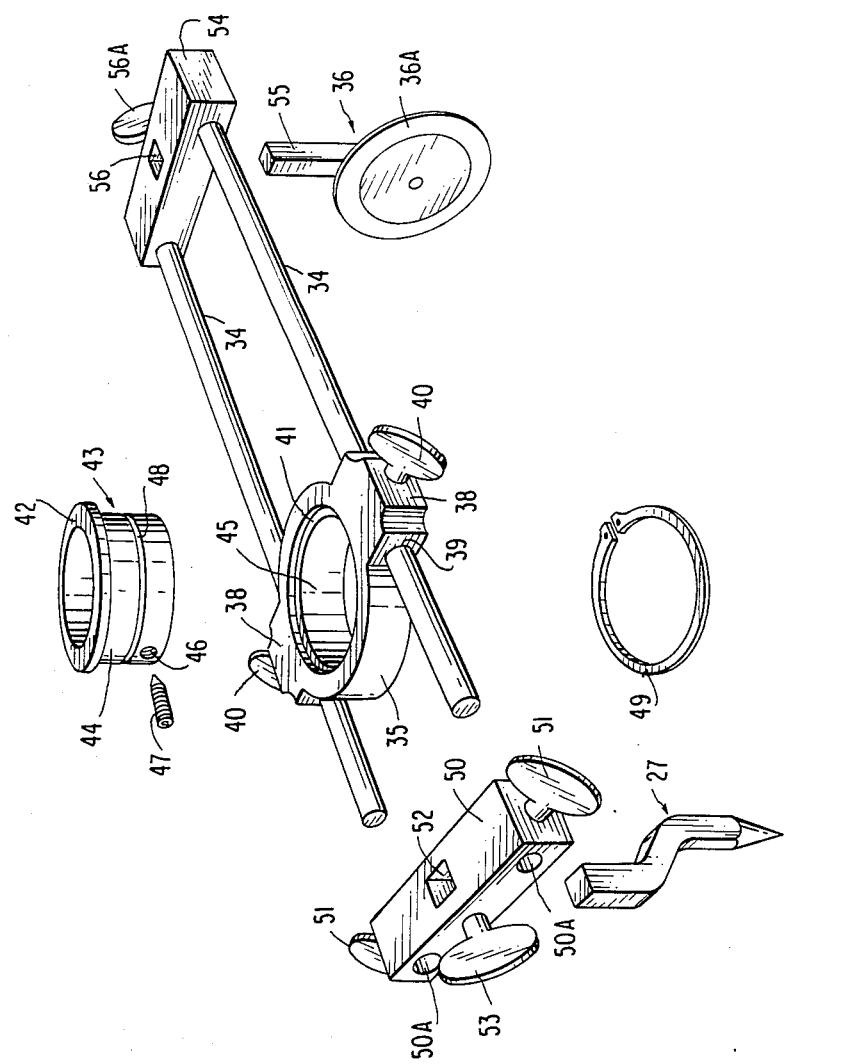
FIG. 6 is an exploded top perspective view of the attachment of FIG. 5.

As shown in the drawings in FIGS. 5–9 each of components 35, 50, 36 and 27 are interchangeable relative to common mounting frame 32A. Suitably however component 35 is located usually intermediate components 35 and 27 as shown in FIGS. 5, 6, 7 and 9 which may be attached to either movable mounting block 50 or fixed mounting block 54. Thus as shown in FIGS. 5 and 8 pivot rod 27 is attached to fixed mounting block 54 and guide wheel assembly is attached to movable mounting block 50. The reverse applies in FIGS. 6, 7 and 9.

Advantageously the attachment of the invention may be used for cutting discs right up to the peripheral edge 57 of metal sheet 58 as shown in FIG. 8. In this case retaining collar 35 may be located adjacent the peripheral edge 57 and is not located between components 36 and 27 as previously described. This results in effective elimination of wastage of metal sheet 58 and thus ensures that the attachment of the invention is economical in use when compared to the prior art.

Also it will be appreciated from FIG. 9 that the attachment of the invention is extremely effective in cutting circles of relatively small diameter. This is because the attachment of the laterally extending rod which is a feature of the prior art is eliminated. Thus as shown in FIG. 9 pivot rod 27 may be located closely adjacent to retaining collar 35 with guide wheel 36A being located outside the circumference of small diameter disc 59 out from metal sheet 58.

From a review of FIGS. 8 and 9 in particular it will be appreciated that the attachment of the invention is extremely versatile in operation compared to the prior art owing to the interchangeability of the respective components.

I claim:

1. An attachment for a cutting torch to permit cutting of circular holes from metal sheet, comprising a mounting frame comprising a pair of spaced parallel guide rods, a support member for pivotally supporting a cutting head of the torch, said support member extending transversely between the guide rods and being mounted for sliding movement along the guide rods, first and second mounting means each extending between the guide rods, said first mounting means being mounted for sliding movement along the guide rods, and said support member and said first mounting means being removable from the guide rods whereby the support member and said first mounting means may be interchanged in position on the guide rods, pivot means for supporting the frame for movement about an axis, the guide means for supporting the frame during such movement whereby the head is carried at a suitable height, said guide means being removably mountable on one of said mounting means, and said pivot means being removably mountable on the other of said mounting means.

2. An attachment as claimed in claim 1, wherein said first mounting means comprises a movable mounting block including a pair of spaced parallel passages for receiving the guide rods and each parallel passage has releasable locking means associated therewith for locking the mounting block in a selected position along the guide rods.

3. An attachment as claimed in claim 1 or claim 2, wherein said second mounting means comprises a fixed mounting block located at one end of said mounting frame.

4. An attachment as claimed in any one of claims 1 to 3, wherein said pivot means is a pivot rod and said guide means is a guide wheel supported on a shaft perpendicular to the axis of the wheel, said first and second mounting means each including a passage perpendicular to the plane of the frame for selectively receiving the pivot rod and the shaft, and releasable locking means for locking the pivot rod and the shaft in the selected passage.

5. An attachment as claimed in claim 4, wherein said pivot rod includes an offset portion adjacent a lower end thereof which, in use, is directed inwardly toward the cutting head.

6. An attachment as claimed in any preceding claim, wherein said support member is a retaining collar which also carries a bush rotatably mounted therein for engagement with said cutting head.

7. An attachment according to claim 4 and claim 6, wherein the passages for receiving the pivot rod and shaft, and the bush are substantially midway between the parallel guide rods.

8. An attachment for a cutting torch to permit cutting of circular holes from metal sheet, comprising a mounting frame comprising a pair of spaced parallel guide rods, a suport member for pivotally supporting a cutting head of the torch, said support member extending transversely between the guide rods and being mounted for sliding movement along the guide rods, first and second mounting means each extending between the guide rods, said first mounting means being mounted for sliding movement along the guide rods, and said support member and said first mounting means being removable from the guide rods whereby the support member and said first mounting means may be interchanged in position on the guide rods, pivot means for supporting the frame for movement about an axis, and guide means for supporting the frame during such movement whereby the head is carried at a suitable height, said guide means being removably mountable on one of said mounting means, and said pivot means being removably mountable on the other of said mounting means, the guide means and the pivot means being interchangeable between the two mounting means.

9. An attachment for a cutting torch to permit cutting of circular holes from metal sheet, comprising a mounting frame comprising a pair of spaced parallel guide rods, a support member for pivotally supporting a cutting head of the torch, said support member extending transversely between the guide rods and being mounted for sliding movement along the guide rods, first and second mounting means each extending between the guide rods, said first mounting means being mounted for sliding movement along the guide rod, and said support member and said first mounting means being removable from the guide rods whereby the support member and said first mounting means may be interchanged in position on the guide rods, a pivot rod for supporting the frame for movement about an axis, and guide means for supporting the frame during such movement whereby the head is carried at a suitable height, said guide means being removably mountable on one of said mounting means, and said pivot means being removably mountable on the other of said mounting means and having an offset end portion adjacent its lower end, said offset end portion, in use, being directed inwardly toward the cutting head.

* * * * *